United States Patent [19]
Van Leer

[11] 3,794,894
[45] Feb. 26, 1974

[54] GYRO HUNT DAMPING CIRCUIT
[75] Inventor: Roger Van Leer, Woodland, Calif.
[73] Assignee: Lear Siegler, Inc., Santa Monica, Calif.
[22] Filed: Mar. 24, 1972
[21] Appl. No.: 237,743

[52] U.S. Cl. .............................. 318/184, 318/178
[51] Int. Cl. ............................................. H02p 5/28
[58] Field of Search ... 318/167, 175, 178, 184, 314, 318/611

[56] References Cited
UNITED STATES PATENTS
3,195,032   7/1965   Shonnard et al. .............. 318/184 X
3,609,488   9/1971   Sampson ............................. 318/314
3,612,970   10/1971  Sofan ................................... 318/175

Primary Examiner—Gene Z. Rubinson
Attorney, Agent, or Firm—Harold L. Jackson; Stanley R. Jones; Eric T. S. Chung

[57] ABSTRACT

A gyro hunt damping circuit for electrically changing the phase of the excitation current applied to a synchronous motor to slowly settle changes in the lag angle of a synchronous motor and thereby dampen motor hunting, is disclosed. The current drawn by a synchronous motor is continually sensed by a current detector circuit which provides an output signal representative of the motor current. The detector output signal is applied to a comparator circuit which serves to compare average current drawn by the motor over a long time period to instantaneous current demand over short time periods. The frequency of a square wave generator, which controls the frequency of excitation current from the AC power supply of the motor, is temporarily changed in accordance with any difference between the average and instantaneous motor current demand.

15 Claims, 1 Drawing Figure

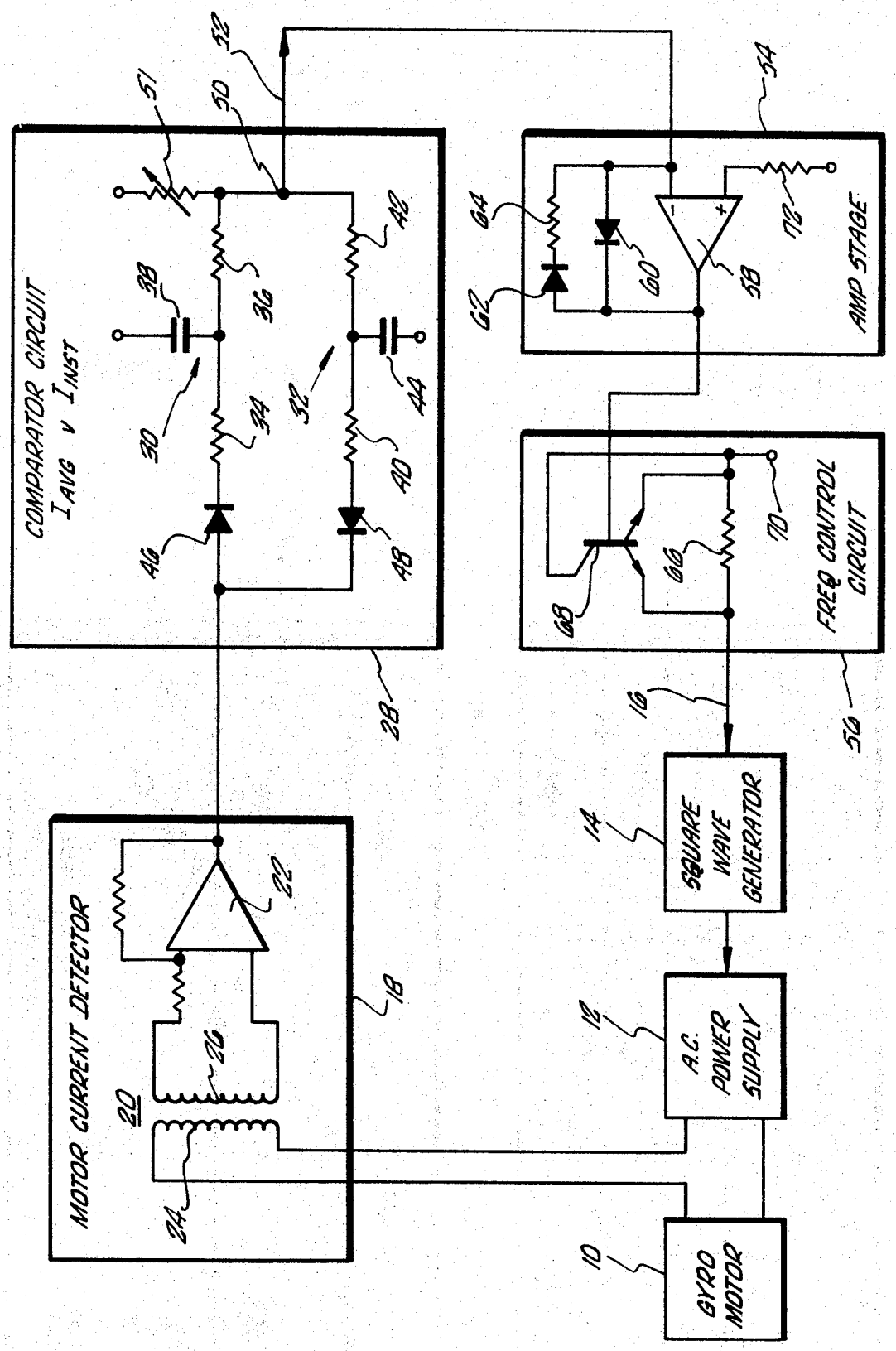

GYRO HUNT DAMPING CIRCUIT

BACKGROUND OF THE INVENTION

1. Field of the Invention

This invention generally relates to control circuits for synchronous motors and the like. More specifically, the present invention concerns a control circuit that may be used for damping the hunting of a synchronous motor employed as the spin motor of a gyroscope by temporarily altering the phase of excitation signals applied to the motor.

2. Description of the Prior Art

A meridian seeking instrument or gyroscope may use a synchronous motor of well known and proven design for the gyro spin motor. As is conventional, when the spin motor has reached synchronous speed, a very small lag angle exists between the induced poles on the hysteresis ring and the rotating magnetic field induced on the wound stators of the motor. Under steady state mechanical and electrical conditions, i.e., at synchronous speed, the lag angle is constant. However, as is well known, this steady state condition is easily disturbed by changes in mechanical and/or electrical conditions. As an example, uncaging of a meridian seeking instrument causes lightly damped torques to be felt by the pendulously supported mass systems.

When a synchronous motor is running at synchronous speed there is a delicate balance between the power supplied and the power required. This difference can be upset by any mechanical disturbance such as during the uncaging of a gyroscope. This disturbance is seen by the motor as a change in load and a change in required power results. If the motor sees an increase in load, the motor will slow down and demand more power to speed it back up. As the friction in the motor bearings is inherently low, the abrupt increase in power will cause the motor to overshoot or run faster than the desired synchronous speed. The demand for power will consequently sharply decrease to cause an overshoot in the opposite direction, i.e., slowing the motor below synchronous speed. As a result, the speed of the motor tends to alternately increase and decrease past synchronous speed in the process of slowly returning to synchronous speed. This phenomenon which may be referred to as "hunting" may produce mechanical vibrations. Such mechanical disturbances are obviously undesirable to operation of a gyroscope in that the process of obtaining accurate azimuth returns may be frustrated for many minutes after each disturbance.

To promote quick stabilization after uncaging a gyroscope, and to make the gyroscope less sensitive to motor disturbances, it is desirable the suppress or dampen the hunting phenomenon of the synchronous motor used as the gyro spin motor. It is accordingly the intention of the present invention to provide a control circuit which operates to produce an electrical phase shift in the excitation signals supplied to a synchronous motor to dampen the motor hunting in response to detected changes in the demand for current by the motor.

SUMMARY OF THE INVENTION

Briefly described, the present invention involves a control circuit which electrically shifts the phase of excitation current supplied to a synchronous motor in response to changes in the current demand.

More particularly, the subject control circuit includes a current detector circuit which monitors motor current demand and provides a representative detector signal to a comparator circuit which serves to compare average motor current to instantaneous motor current. Frequency control signals are provided in accordance with detected differences in current demand which are correlative with changes in the motor speed, to appropriately control the frequency of a square wave generator which controls the frequency of the AC power source supplying power to the synchronous motor.

The objects and many attendant advantages of the invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

The FIGURE is a schematic block diagram illustrating a gyro hunt damping circuit in accordance with the present invention.

DESCRIPTION OF THE PREFERRED EMBODIMENT

Referring to the FIGURE, a gyro spin motor 10 is connected to be supplied with AC power by a conventional AC power supply 12. The frequency of the excitation current provided by the power supply 12 is controlled by a square wave generator 14 in a conventional manner.

The square wave generator 14 may be any conventional circuit such as a bistable multivibrator, the frequency of which is controlled by the amplitude of input voltages applied at an input terminal 16 thereof.

As earlier mentioned, the current demanded by a synchronous motor is indicative of deviations of the speed of the motor from synchronous speed. These speed deviations may thus be determined by monitoring the motor current. For example, should the rotor of the synchronous motor slow down, increased current will be demanded to return the rotor to synchronous speed. A motor exceeding synchronous speed will demand less current and will be slowed.

The current demanded by the gyro motor 10 may be continually monitored by a motor current detector circuit 18 which will provide an output signal that is representative of motor current. As shown, the detector circuit 18 may include a transformer 20 and an amplifier 22. The transformer 20 may be connected to have the primary coil thereof connected in series between the AC power supply 12 and the gyro spin motor 10. A secondary coil 26 of the transformer 20 is connected to the inputs of the amplifier 22 which serves to provide a desired output signal having an amplitude representative of the current demanded by the motor 10. As an example, increased current demands may be represented by an increase in the amplitude of the output signals provided by the amplifier 22.

A comparator circuit 28 is connected to receive the output signals provided by the amplifier 22 of the current detector circuit 18. The comparator circuit 28 serves to compare instantaneous motor current with average motor current. Since the average motor current and the instantaneous motor current are equal when the motor 10 is at synchronous speed, any difference between the average and instantaneous current would be indicative of the motor 10 not being at synchronous speed. This difference would be attributable to changes in the instantaneous current demand of the motor 10. A slowing of the motor 10 would result in increased current demand while speeds exceeding synchronous speed would produce decreased current demand. Comparing the average current demand to the instantaneous current demand of the motor 10 thus enables determination of any motor speed changes and the direction of such changes, i.e., faster or slower.

The comparator circuit 28 accordingly includes a pair of channels 30 and 32 respectively having a long RC time constant and a short RC time constant. To this end, the channel 30 includes a pair of series connected resistors 34 and 36 having an appropriately sized capacitor 38 connected between the resistors 34 and 36 to be changed by current flow through the channel 30. The channel 32 also includes a pair of series connected resistors 40 and 42 between which is connected a capacitor 44 to be changed by current flow through the channel 32. The elements in each of the channels 30 and 32 are sized to provide the desired RC time constants. A diode 46 is connected in the channel 30, in series with the resistors 34 and 36, to permit current flow therethrough during one half cycle. Similarly, a diode 48 is connected in the channel 32 in series with the resistors 40 and 42 to permit current flow through the channel 32 during the remaining half cycle. As shown, the diodes 46 and 48 are biased in opposite directions such that the respective channels will only receive current during the selected one of the two half cycles of the AC signals provided from the motor current detector circuit 18. The voltage level to which the capacitor 38 is charged will indicate the motor current averaged over a long time period, i.e., average, while the level to which the capacitor 44 is charged will indicate motor current over a short time period, i.e., instantaneous. These capacitor voltages are summed at a summing junction 50. When the motor is at synchronous speed, the output of the comparator circuit 28 would in theory be zero. However, in practice a non-zero value may be used, for reasons to be later explained. A variable resistor 51 may be connected between a bias voltage source and the junction 50 to permit adjustment of the output from the comparator circuit 28 to a desired "synchronous" output voltage level. Using such a "synchronous," non-zero, output voltage level, and assuming that the channel 32 is poled negative, decreases in the speed of the motor will produce increased current demand (and flow) such that the capacitor 44 is charged to a higher voltage level. The output signal provided by the comparator circuit 28 at the output terminal 52 would be reduced or changed in a negative direction. On the other hand, an increase in the speed of the motor 10 will result in decreased current demand (and flow) such that the level to which the capacitor 44 is charged will decrease below the level of the charge on the capacitor 38 and the output of the comparator circuit 28 will be increased or changed in a positive direction. The output signals developed by the comparator circuit 28 are applied to an amplifier stage 54 to appropriately operate a frequency control circuit 56 to change the frequency of the square wave generator 14. Such frequency change would effect the desired temporary phase shift of the excitation current supplied to the motor 10 to counter the change in current demanded by the motor 10 and thereby dampen hunting.

Assume that motor slowing is remedied by increasing the frequency of the excitation current and that application of a higher input voltage to the generator 14 via the lead 16 will increase the frequency of the generator 14. The amplifier stage 54 may then include an operational amplifier 58 having the usual inverting input terminal to which outputs from the comparator circuit 28 are applied. The non-inverting input terminal of the amplifier 58 would be connected to receive a reference potential. A diode 60 may be connected between the output and the inverting input terminal of the operational amplifier 58 to provide negative feedback. A serially connected diode 62 and resistor 64 may be connected in parallel with the diode 60, as shown, to provide temperature compensation if desired.

The frequency control circuit 56 is connected to receive the ouptut signals from the amplifier 58 and in response thereto appropriately vary the voltage level of signals at the input terminal 16 of the generator 14. Any conventional circuit available in the prior art may be used for the frequency control circuit 56 to accomplish the desired purpose. As an example, a resistor 66 may be connected in parallel with, and between the emitters of, a two emitter transistor 68 such that control of the voltage applied to the base terminal of the transistor 68 will precisely control the total resistance presented by the parallel combination. For example, if the transistor 68 is biased into full conduction, then the resistor 66 would be short circuited. Conversely, if the transistor 68 is non-conductive, then the resistor 66 would provide the full resistance. Finally, if the transistor 68 is chosen to provide an equal resistance when biased to one half conductivity, then the combined resistance would be one half that of the resistor 66. Obviously, varying the resistance will vary the amplitude of the signal applied to the square wave generator from a bias source connected to a terminal 70. In the illustrated case, a decrease in resistance will effect an increase in the frequency of the generator 14 to counter a slowing down of the motor 10 and the increased current demand attendant thereto.

It has been found that it may be preferable to operate at a potential other than zero volts for ground potential. Accordingly, any preferred ground potential may be used. The non-inverting terminal of the amplifier 58 would be connected to such ground potential through a resistor 72, if necessary to have the amplifier operated with a particular reference level.

The variable resistor 51 which is connected to the summing junction 50 and to a source of bias voltage permits the output signal level of the comparator circuit 28 to be adjusted or initialized to have the "synchronous" level concurrent with the square wave generator 14 providing a selected frequency, i.e., 400 hz.

It has been found that for certain meridian seeking instruments, that it is satisfactory to have the motor current detector 18 output set at 250 milliamps when the motor 10 is at synchronous speed. It may be expected that the current will vary by as much as 20 percent, i.e., ± 50 milliamps. Obviously, any desired operating parameters may be employed, by design, to suit a particular purpose.

The specific values for elements such as resistors, capacitors, etc. have not been provided. However, it is to be understood that this is a matter of design choice and that any element values consistent with the desired results may be employed.

From the foregoing description it is now apparent that the present invention provides a control circuit that would be useful with any synchronous motor for countering hunting of the motor by temporarily shifting the phase of the excitation signals supplied to the motor in the direction necessary to counter the changed motor current demand attendant to hunting.

While a preferred embodiment of the present invention has been described hereinabove, it is intended that all matter contained in the above description and shown in the accompanying drawing be interpreted as illustrative and not in a limiting sense and that all modifications, constructions and arrangements which fall within the scope and spirit of the invention may be made.

What is claimed is:

1. A control circuit for damping hunting of a synchronous motor by temporarily shifting the phase of excitation signals applied to the motor by controlling the frequency of the motor power supply in accordance with detected changes in motor current, the control circuit comprising:
   detector means for continually monitoring motor current, a detector signal representative of said motor current being provided;
   comparator means, connected to receive said detector signals, for continually comparing average motor current to instantaneous motor current, a comparator output signal being provided that is indicative of such comparison and the relative magnitudes of the average motor current and the instantaneous motor current;
   a frequency generator for controlling the frequency of a power source which supplies excitation signals to said motor; and
   frequency control means for altering the frequency of said frequency generator in response to said comparator output signal to have the phase of said excitation signals changed in a preselected direction to damp said hunting.

2. The control circuit defined by claim 1, said frequency generator including a square wave generator.

3. The control circuit defined by claim 1, said frequency generator including a bistable multivibrator.

4. The control circuit defined by claim 1, said frequency control means including:
   variable resistance means for selectively changing the magnitude of input signals applied to said frequency generator; and
   means responsive to said comparator output signals for changing the resistance of said variable resistance means.

5. The control circuit defined by claim 4, said variable resistance means including a resistor and voltage responsive resistance means connected in parallel with said resistor for changing the combined resistance presented by said variable resistance means, the magnitude of input signals to said frequency generator being changed in accordance with said changes in the resistance of said variable resistance means.

6. The control circuit defined by claim 1, said detector means including a transformer having a primary coil that is to be connected in series between a synchronous motor to be controlled and the power source for said motor.

7. The control circuit defined by claim 1, said comparator means including:
   first and second channels each receiving said detector signal, said first channel having means for averaging said detector signal over a time period to provide an indication of average motor current, said second channel having means responsive to said detector signal for providing an indication of instantaneous motor current; and
   means for summing the outputs of said first and second channels to provide said comparator output signals.

8. The control circuit defined by claim 7, said first and second channels each including means for limiting the flow of current through said channels to alternate half cycles of said detector signal, current flow in said first and second channels being permitted in different half cycles.

9. The control circuit defined by claim 8, said first and second channels each including means for providing the respective channels with a selected RC time constant, the first channel having the longer RC time constant.

10. The control circuit defined by claim 9, said frequency control means including:
    variable resistance means for selectively changing the magnitude of input signals applied to said frequency generator; and
    means responsive to said comparator output signals for changing the resistance of said variable resistance means.

11. The control circuit defined by claim 10, said variable resistance means including a resistor and voltage responsive resistance means connected in parallel with said resistor for changing the combined resistance presented by said variable resistance means, the magnitude of input signals to said frequency generator being changed in accordance with said changes in the resistance of said variable resistance means.

12. The control circuit defined by claim 11, said frequency generator including a square wave generator.

13. The control circuit defined by claim 12, said detector means including a transformer having a primary coil that is to be connected in series between a synchronous motor to be controlled and the power source to said motor.

14. The control circuit defined by claim 1 wherein said synchronous motor is a gyro spin motor.

15. The control circuit defined by claim 13 wherein said synchronous motor is a gyro spin motor.

* * * * *